2,893,984
POLYMERIZATION OF ALPHA OLEFINS

Charles W. Seelbach, Cranford, and William John Gilbert McCulloch, Plainfield, N.J., assignors to Esso Research and Engineering Company, a corporation of Delaware No Drawing. Application April 2, 1956
Serial No. 575,370

10 Claims. (Cl. 260—93.7)

This invention relates to a novel polymerization process, and to the products of this process. More particularly, it relates to the polymerization of alpha-olefins of the formula R—CH=CH$_2$, where R is a hydrocarbon group, with a new type of catalyst composed of a solid substantially insoluble component comprising a major proportion of an at least partially reduced compound of a reducible heavy metal of groups IV($b$), V($b$), VI($b$) and VIII of the periodic table, and a minor proportion of elemental metal of said same groups, this solid catalyst component having been activated by an organo-metal compound of a metal of groups II and III of the periodic table. The catalyst may be exemplified by one made by reducing TiCl$_4$ with titanium powder at 400° C. to make a violet crystalline TiCl$_3$ according to the following reaction:

$$3TiCl_4 + Ti \rightarrow 4TiCl_3$$

preferably using such proportions and reaction conditions to maintain a small excess of free unreacted titanium, and then activating this solid catalyst in pulverized form, with an alkyl metal compound such as aluminum triethyl, preferably dissolved in an inert solvent such as normal-heptane.

TiCl$_3$ is known to exist in several forms. For instance, if TiCl$_4$ is reacted with hydrogen in the presence of a solid electric discharge, TiCl$_3$ is produced in a brown amorphous form. Also, it is known that this brown amorphous TiCl$_3$ may be converted by heating at 200° C. to produce a violet-colored crystalline form of TiCl$_3$. It is also known that at very high temperatures such as 400–470° C., TiCl$_3$ may disproportionate into TiCl$_2$ and TiCl$_4$. It has also been disclosed in the literature that some TiCl$_3$ may be made according to the equation $$3TiCl_4 + Ti \rightarrow 4TiCl_3$$

by heating a mixture of the Ti powder with liquid TiCl$_4$ in a closed tube at 250° C.

Most of the above methods make products which differ from each other physically and chemically.

According to the present invention, a still further modification is used to prepare the TiCl$_3$, namely by heating to a substantially higher temperature in the range of 350–600° C., preferably about 400–500° C. The pressure may be from about 5 to 100 atmospheres, preferably about 10 to 50 atmospheres, and the time of reaction may be varied from about 1 hour to 1,000 hours, preferably about 10 to 500 hours. Both the pressure and time vary inversely according to the temperature used. The reaction is preferably carried out in a suitable pressure vessel such as an autoclave, and this is preferably provided with means for agitation during the reaction.

The proportions of materials to be used may vary as desired, within the approximate limits of about 0.5 to 2.0 mols, preferably about 0.8 to 1.5 mols of Ti, per 3 mols of TiCl$_4$, and the reaction is either carried out to the complete reaction of all of the Ti, or preferably only to such extent as to leave an excess of titanium, in the range of 0.1 to 1.0 mol of titanium per 4 mols of TiCl$_3$.

After the reaction has been carried out to the desired extent, the reaction vessel is cooled and the reaction mass, which is essentially a granular solid mass, which may contain some free unreacted titanium chloride liquid, and some free titanium powder, or titanium atoms, is preferably filtered to remove any TiCl$_4$ liquid, and then washed with a suitable inert liquid such as normal heptane.

The resultant high temperature metal reduction product of the reducible titanium chloride, is then preferably ground to a powder, or otherwise comminuted, to a suitable state of fineness, e.g. preferably finer than 20 mesh per linear inch, and preferably between about 100 mesh and 500 mesh. The resulting powder is then added to about 5–100 parts by weight of a suitable liquid such as normal heptane, and it is activated by addition of an organo-metal compound, such as aluminum triethyl, or aluminum diethyl monochloride, preferably added in solution in a similar solvent such as normal heptane. In effecting this activation, an Al/Ti molar ratio of 0.1 to 20.0 may be used, preferably about 0.5–5, e.g. 0.5–5 mols of aluminum triethyl per mol of high temperature Ti— reduction product of TiCl$_4$, calculated as if it were TiCl$_3$, though it may contain some free or only partially combined Ti. Catalyst slurry may then be either used directly for promoting various chemical reactions such as polymerization of alpha olefins of the formula R—CH=CH$_2$, e.g. propylene and so forth, or, if desired the catalyst slurry may be agitated for a period of time of from 1 min. to an hour or so, at room temperature or slightly elevated temperature, e.g. 20–60° C.

The principles of making this new catalyst may be applied not only to the reduction of TiCl$_4$ to TiCl$_3$, but also the further reduction of TiCl$_3$ to TiCl$_2$ according to the equation $$2TiCl_3 + Ti \rightarrow 3TiCl_2$$

Or else the TiCl$_4$ may be reduced directly to TiCl$_2$ according to the equation $$TiCl_4 + Ti \rightarrow 2TiCl_2$$

In each case, however, it is preferable to use a sufficient excess of the titanium to have about 0.1 to 1.0 mol of titanium present in the final product per mol of the reduced titanium chloride. As an additional guide in carrying out this invention, it may be stated that regardless of the number of chlorine atoms present in the starting titanium chloride, and regardless of the proportions of titanium chloride and titanium used, it is preferable that the final reduced product contain an excess of about 1–50%, preferably about 5–25%, of titanium, by weight.

In making the new catalysts used in this invention, it is possible to use other titanium halides or other titanium compounds such as the titanium acetyl acetonate, hydrated oxide, alcoholates, etc., or mixed compounds such as TiCl$_2$(OCH$_3$)$_2$. Also, more broadly, in place of titanium compounds, corresponding compounds of other reducible metals of groups IV($b$), V($b$) and VI($b$) of the periodic table may be used, including for instance Zr, Hf, V, Nb, Ta, Zr, Mo and W. Certain other reducible heavy metals of groups VIII may be used such as manganese and iron compounds.

Instead of using individual compounds, one may use mixtures of two or more different materials such as TiCl$_4$ and ZrCl$_4$, and it is not necessary that the metal used for reducing the TiCl$_4$ be titanium, but may be any one of the other heavy metals listed above, or mixtures thereof.

The organo-metal compound to be used in activating the reduced heavy metal halide is aluminum trialkyls, which may have 1 to 20 carbon atoms, preferably 2 to 12 carbon atoms in the alkyl groups, and these alkyl groups may be either like or unlike, or one may use various aluminum dialkyl mono-halides, e.g. aluminum diethyl mono-chloride, aluminum diethyl monobromide, aluminum dimethyl mono-chloride, or other substituted alumium alkyl compounds such as aluminum dimethyl methoxy, or various other derivatives having the general formula $AlR_2X$, where X may be a secondary amine, acid amide, mercaptan, thiophenol, carboxylic acid, etc., or, more broadly, one may use other reducing compounds of metals of the second and third groups of the periodic table such as zinc and magnesium hydrocarbon halides, or zinc and magnesium dialkyls, or corresponding aryl compounds, or any of these compounds together with an alkali metal or alloy, or an alkali metal hydride.

In preparing catalysts for use in this invention, all steps should be carried out in the absence of moisture, and preferably also in the absence of oxygen or other harmful impurities. This may be done readily by blanketing the materials with an inert gas such as nitrogen. The raw materials, i.e. both the reactants and inert liquids, etc. may be preferably purified or otherwise treated to remove traces of moisture, oxygen or other impurities.

The details of catalyst preparation will be better understood from a consideration of the following experimental data, which are given merely for the sake of illustration.

EXAMPLE I.—MAKING CATALYST BASE

Titanium powder (12.5 grams containing 20% added moisture) is heated in a 300 ml. Aminco microbomb to vaporize the moisture which is vented with nitrogen. The bomb is heated to 100° C. for 2 hours, 150° C. for 1 hour and 190° C. for 60 hours. The pressure increased from 0 p.s.i.g. to 120 p.s.i.g. during the first two hours. The bomb is vented and then filled with nitrogen at 100 p.s.i.g. and vented three times. This flushing procedure is repeated at each stage in the heating. The bomb is cooled, opened in a nitrogen atmosphere and 100 grams of $TiCl_4$ (58 ml.) is added. The bomb is sealed in the nitrogen atmosphere, placed in a rocker and heated to 400° C. for 48 hours with shaking. The bomb is opened in a nitrogen atmosphere. The product is placed in a sintered glass filter funnel, the unreacted $TiCl_4$ filtered off and the purple solid washed three times with dry n-heptane. This solid is partially soluble in isopropanol giving a blue solution. Addition of water to this solution results in violent gas evolution and loss of color. A small amount of black powder is insoluble. This is probably unreacted titanium powder.

X-ray analysis shows that this purple solid is primarily crystalline $TiCl_3$ with a small amount (approximately 15%) of unreacted titanium powder. The crystal structure of this $TiCl_3$ is rhombohedral, and it is believed that in this configuration each metal ion is surrounded by six chlorine atoms (coordination number of the metal is six) and each chlorine atom is in turn shared by two metal ions except for the surface chlorine atoms, which are believed to provide a special activating influence on the surface of the solid catalyst particles, particularly after further activated by the addition of aluminum triethyl or other organo-metal compound that in the preferred embodiment of this invention, the presence of excess Ti atoms have an additional activating effect at the surface of the solid catalyst particles, and it is believed that the presence of the excess titanium is in some manner responsible for the very much better yields (grams of polymer per gram of catalyst) obtained than when using plain $TiCl_3$ without excess Ti, or by using $TiCl_3$ made by some other process than the high temperature reduction of $TiCl_4$ by Ti powder.

EXAMPLE II.—ACTIVATED CATALYST 0.5 gram of the crystalline violet $TiCl_3$ prepared in Example I, and containing approximately 15% of unreacted Ti powder, is ground to a powder with mortar and pestle in a nitrogen atmosphere and transferred to a large test tube containing 50 ml. (34 grams) of dry n-heptane. To this mixture is added 10 ml. of an 0.876 molar solution of Al triethyl in n-heptane, containing about 1 gram of aluminum triethyl. The mixture is agitated thoroughly, and the resulting slurry is then ready for use at a catalyst. The Al/Ti molar ratio of this mixture is about 2.8/1.

EXAMPLE III.—ACTIVATED CATALYST 1.8 grams of the crystalline $TiCl_3$ made in Example I, is pulverized and slurried in 20 ml. of dry n-heptane, and then mixed with 20 ml. of 0.876 molar aluminum triethyl and 10 ml. of 0.876 molar aluminum diethyl monochloride, and additional dry n-heptane added to make a total volume of 50 ml. The catalyst is now ready for use.

In using the above described novel catalysts for polymerization of alpha-olefins according to the present invention, it is desirable to charge the catalyst, in the form of a fine slurry in normal-heptane, having a concentration of about 0.01 to 50%, preferably 0.1 to 10%, by weight of catalyst, into an autoclave or other suitable pressure reactor. The alpha-olefin to be used as reactant, is then also charged into the reactor, alone or together with additional diluent or solvent, then the reactor is closed, pressurized with dry nitrogen to the desired pressure of about 50–1500 p.s.i.g., preferably about 100–1000 p.s.i.g., and the reactor or contents agitated, while the temperature is gradually raised until reaction starts, as may be judged by a reduction in the rate of pressure increase. The polymerization temperature may range from about 20–100° C., preferably about 60–90° C., and the reaction time may be from about 10 minutes to 100 hours, generally about 1 to 40 hours. The reaction rate is a function of temperature, catalyst concentration and monomer concentration.

EXAMPLE IV.—POLYMERIZATION OF PROPYLENE 1.8 grams of crystalline $TiCl_3$ prepared as described in Example I is pulverized with a mortar and pestle, slurried in 20 ml. of dry n-heptane and added to a 1-liter Aminco bomb in a dry nitrogen atmosphere. 20 ml. of 0.876 molar Al triethyl and 10 ml. of 0.876 molar Al diethylmonochloride made-up to a total volume of 50 ml. with dry n-heptane are added to the bomb. The bomb is sealed in the nitrogen atmosphere and placed in a rocker. Approximately 300 grams of propylene (Matheson C.P.) is collected in a feed reservoir cooled with a Dry-Ice-isopropanol bath. The feed charge is pressured into the reactor with 400 p.s.i.g. of nitrogen, the rocker started and the bomb heated to 80° C. for 40 hours. The pressure increased to a maximum of 420 p.s.i.g. and decreases to 300 p.s.i.g. when the bomb is cooled to room temperature. These pressure changes indicate a rapid reaction since the pressure usually increases to a maximum of 600–700 p.s.i.g. as the temperature increases to 80° C.

The product is a one-piece plug which is purple to black in color and oxidizes rapidly in air to a white solid. The total yield is 305 grams with a corresponding catalyst efficiency of 64 grams/gram total catalyst. The cold heptane insoluble fraction at 25° C. is 98.4% or 300 grams of the total. The cold heptane soluble fraction at 25° C. is 1.6% or 5 grams, and is a tacky solid. The cold heptane insoluble material is a hard solid with a melting point of 155–160° C. Infrared and X-ray analysis show the solid to be a highly crystalline material. $TiCl_3$ alone is inactive under these conditions.

The crystalline heptane-insoluble fraction showed the following additional evaluation:

| Property: | Test data |
|---|---|
| Intrinsic viscosity | 1.92 |
| Softening-melting point (° C.) | 155/160 |
| Tensile strength (p.s.i.) | 3040 |
| Elongation, percent | 0 |
| Modulus of rigidity (p.s.i. $\times 10^{-5}$): | |
| +25° C. | 0.42 |
| 0° C. | 3.39 |
| −70° C. | 5.86 |
| Melt index | 3.3 |

For the sake of comparison, the following corresponding evaluations are given for a crystalline fraction of polypropylene made under somewhat similar polymerization conditions except using $TiCl_4$ instead of the special $TiCl_3$ of this invention, in the preparation of the catalyst, and using a polymerization temperature of 75° C. and a pressure of 550 p.s.i.g.

| Property: | Test data |
|---|---|
| Intrinsic viscosity | 1.34 |
| Softening-melting point (° C.) | 97/155 |
| Tensile strength (p.s.i.) | 730 |
| Elongation, percent | 150 |
| Modulus of rigidity (p.s.i. $\times 10^{-5}$): | |
| +25° C. | 0.040 |
| 0° C. | 0.396 |
| −70° C. | 4.54 |
| Melt index | Not tested |

The above data show that by the use of the special $TiCl_3$ according to the present invention, a much higher intrinsic viscosity is obtained, i.e. 1.92 compared to only 1.34 obtained when $TiCl_4$ is used in the catalyst preparation. Similarly, a higher softening point is obtained, 155° C. compared to only 97, a higher tensile strength of 3040 p.s.i. compared to only 730, and a much lower elongation, namely 0, compared to 150 for the product made using $TiCl_4$ in the catalyst preparation. Likewise, the product of this invention shows a substantially higher modulus of rigidity, and a much superior rigidity/temperature relationship, meaning relatively less development of brittleness at lower temperatures.

EXAMPLE V

Example IV was repeated except with a few changes namely, that in preparing the catalyst 0.4 gram of $TiCl_3$, made in Example I, and 6 ml. of 0.876 molar solution of $Al(C_2H_5)_3$ in normal heptane, were used, and 400 ml. of normal heptane was added to the polymerization reactor bomb during the catalyst preparation. The amount of propylene fed to the reactor was approximately 135 grams. The polymerization temperature pressure and time were the same as used in Example IV.

The product was a violet colored slurry of granular particles that gradually turned white when the slurry was poured into excess isopropanol. The product was filtered and the filtrate evaporated. The filtrate evaporation residue was a tacky brown solid weighing 3 grams. The solid residue of filtration was added to 2 liters of heptane and refluxed for 70 hours on a steam bath and then filtered hot. The extract was evaporated on the steam bath and the two fractions of the product dried in vacuo for 16 hours at 70° C. The heptane-insoluble portion weighed 96.5 grams and had a S.P./M.P. of 155–165° C. The heptane-soluble portion weighed 26.5 grams and had a S.P./M.P. of 60–67° C. The total yield was 125 grams, giving a catalyst efficiency of 125 grams of polymer/gram of catalyst and a slurry concentration of 31 weight percent polypropylene.

Further examination of the polymerization product fractions obtained in this experiment gave the following data.

*Summary of molecular weights of polymer fractions*

| Fraction | Percent of Polymer | Heptane-Solubility | Int. Vis. | Mol. Wt. (Harris) |
|---|---|---|---|---|
| A | 2 | Soluble, room temp | 0.34 | ≅8,000 |
| B | 21 | Soluble, at reflux | 0.70 | 21,000 |
| C | 77 | Insoluble | 3.10 | 215,000 |

The above data in Example V show that this run gave an even better catalyst efficiency than Example IV (namely, 125 compared to 64 grams polymer per gram of catalyst), and produced a crystalline polypropylene of even higher molecular weight as indicated by an intrinsic viscosity of 3.10 in Example V compared to 1.92 in Example IV, both of these being substantially superior to the intrinsic viscosity of 1.34 obtained with somewhat similar polymerization conditions but using a catalyst based on $TiCl_4$ instead of the $TiCl_3$ used in Examples IV and V.

EXAMPLE VI $TiCl_3$ prepared as in Example I, containing some free titanium, is ground to a powder with a mortar and pestle and 0.9 gram of this material is added directly to a 1-liter bomb in a dry nitrogen atmosphere. The last traces of powder are rinsed from the weighing bottle to the bomb with 10 ml. of dry n-heptane. An additional 235 ml. of dry n-heptane is added, followed by 10 ml. of 0.876 M $Al(C_2H_5)_3$ in n-heptane and 5 ml. of 0.876 M $Al(C_2H_5)_2Cl$ pipetted directly into the bomb. The bomb is sealed in the dry nitrogen atmosphere.

The bomb is placed in a rocker and connected to the 1-butene feed line. Approximately 250 grams of 1-butene (Matheson C.P.) is transferred to the feed reservoir which is cooled in a Dry Ice-isopropanol bath. The feed reservoir is pressured with 400 p.s.i.g. nitrogen pressure and the valve to the reactor opened. As soon as the 1-butene charge is in the reactor, the rocker is started and the bomb is heated to 80° C. over a period of three hours. The pressure increases to a maximum of 520 p.s.i.g. After 40 hours at 80° C. the bomb is cooled. The off gas is measured at 10 liters and the bomb opened. The bomb is filled with a solid plug of violet poly-1-butene. The polymer is removed and added to a large excess of isopropanol which gradually decolorizes the material by reacting with the catalyst residue. The polymer is cut into small pieces and refluxed in isopropanol containing 20 ml. of acetylacetone for 16 hours. The polymer is then filtered and washed with isopropanol three times and methyl ethyl ketone three times. It is then dried in vacuo at 70° C. for 16 hours. The white product weighs 216.3 grams which gives a catalyst efficiency of 90 gms./gm. The conversion of 1-butene is essentially complete since the feed system has a hold-up of 30 ml. The calculated weight of the feed is 230 grams and the product isolated weighed 216 gms. This is a substantially quantitative yield within experimental error.

The product has a S.P./M.P. of 106–110° C. and two samples of the product have intrinsic viscosities of 2.6 and 3.3. These correspond to molecular weights (Harris) of 170,000 and 245,000, respectively. The highest molecular weight obtained previously with the $TiCl_4$-$AlR_3$ catalysts was 125,000, but this was obtained in low yield (3 gms./gm.). The highest yield obtained previously was 75 gm./gm. and this polymer had a molecular weight of only 58,000.

Hot ether extraction of this higher molecular weight product gave 77% insoluble material compared to 64% for the 58,000 molecular weight material mentioned above. Thus the poly-1-butene of this invention is a more crystalline product.

Thus the polymerization process of this invention using the novel catalyst described above results in the production of a crystalline poly-1-butene of desirable very high molecular weight and with good catalyst efficiency. The Harris molecular weight obtained in Example VI was 170,000 to 245,000 compared to a relatively poorer molecular weight of 30,000 obtained by polymerization of 1-butene under somewhat similar conditions but using a catalyst based on a plain TiCl$_3$ and not containing any free titanium, and made by an unknown process. The catalyst efficiency obtained in Example VI of the present invention was 90 grams of polymer per gram of catalyst compared to only 1.7 grams of polymer per gram of catalyst in the other process just referred to which produced a poly-1-butene of only 30,000 molecular weight.

Another point of superiority of the poly-1-butene made according to the present invention, is its low unsaturation. For instance the product made in Example VI, which had a Harris molecular weight of 245,000 had the very low unsaturation of 0.69 cg. of iodine per gram; whereas the other poly-1-butene referred to above which had a Harris molecular weight of about 58,000 had a very much higher unsaturation of 6.61 cg. of iodine per gram.

EXAMPLE VI

Violet TiCl$_3$ (0.6 gram) prepared as described in Example I is added to 250 ml. of dry n-heptane followed by 11.5 ml. of 0.88 molar AlEt$_3$ in n-heptane. This mixture is made up to a total volume of 500 ml. with heptane. After one hour at room temperature this catalyst slurry is transferred to a 3-liter autoclave. An additional 700 ml. of n-heptane is also added to the autoclave. The stirrer is started and 360 grams of cold liquid propylene is injected into the reactor. The temperature is increased to 80° C. and maintained for 4 hours. The pressure was 150 to 260 p.s.i.g. Polypropylene was recovered at the exceptionally high catalyst efficiency of 163 grams of polymer per gram of catalyst. The polymer was 78% insoluble in refluxing heptane and had a molecular weight (Harris) of 175,000.

An advantage of the present invention, particularly useful in continuous operation, is the ability to produce the polymer in the form of granular slurries, instead of a single large solid plug. For best results, the olefin monomer concentration should be about 15 to 35%. This range also gives optimum polymerization rate in terms of catalyst efficiency at 20 to 30 weight percent propylene concentration in heptane. A 10% propylene concentration the rate of polymerization drops off. At 40 to 50% propylene concentration the polymer is no longer obtained as slurry.

A typical example of these autoclave studies and a summary of the results are given in the following table.

below an Al/Ti ratio of 2 is especially novel. Also the change in molecular weight as Al/Ti ratio changes is small compared to the corresponding effect using AlEt$_3$—TiCl$_4$ type catalysts.

The polypropylene made by use of TiCl$_3$—AlEt$_3$ differs from that made by TiCl$_4$—AlEt$_3$ in these respects:

(a) Higher crystallinity—confirmed by X-rays—and specific gravity figures;
(b) Higher softening and melting points;
(c) A much stronger material (3-fold increase in tensile strength);
(d) Much less extensible;
(e) Much more rigid (high modulus of rigidity values);
(f) Lower permeability to vapors and gases, e.g. moisture vapor, etc.

These latter properties are very useful in such uses as injection molding, rigid pipe fibers, films, etc.

*Typical values for polypropylene obtained by use of two different catalyst systems*

|  | AlEt$_3$—TiCl$_4$ | AlEt$_3$—TiCl$_3$ |
|---|---|---|
| Intrinsic Vis.[a] | 1.8 | 2.5 |
| Specific Gravity [b] | 0.870 | 0.895 |
| Softening Point, °C.[c] | 120 | 155 |
| Melting Point, °C.[c] | 158 | 165 |
| Tensile Strength (p.s.i.) [d] | 1,450 | 4,200 |
| Elongation (percent) [d] | 650 | 20 |
| Modulus of Rigidity, p.s.i. × 10$^{-5}$ @ 25° C.[e] | 0.12 | 1.0 |
| Melt viscosity (poises × 10$^{-4}$) Parallel plate plastometer: |  |  |
| 170° C | | |
| 190° C | 3 | 10 |
| 215° C | <1 | 4.3 |

[a] In Tetralin @ 125° C.
[b] Jolly balance.
[c] Nalge instrument.
[d] A.S.T.M. D-412.
[e] A.S.T.M. D-1043.

Polypropylene has been synthesized in both bombs and the three liter autoclave with AlEt$_2$Cl—TiCl$_3$ catalyst at an Al/Ti ratio of 2. The general technique of Example IV gave a catalyst efficiency of 125 grams of polymer per gram of catalyst. The polymer is 67% insoluble in hot heptane and has a molecular weight of 190,000. However, the mechanical properties are much different from those of polymers prepared with AlEt$_3$.

Also the properties of the polypropylene made with the

*Summary table—autoclave*

| Catalyst | Al/Ti Ratio | T, ° C. | Percent Propylene | Cat. Eff. (gms./gm.) | Mol. Wt. ×10$^{-3}$ (Harris) | Hot n-heptane, Insoluble Percent |
|---|---|---|---|---|---|---|
| AlEt$_3$—TiCl$_3$ | 3 | 80 | 30 | 34 | 200 | 81 |
| AlEt$_3$—TiCl$_3$ | 3 | [1] 80 | 30 | 81 | 106 | 67 |
| AlEt$_3$—TiCl$_3$ | 3 | [2] 65 | 30 | 58 | 190 | 70 |
| AlEt$_3$—TiCl$_3$ | 3 | [2] 80 | 30 | 77 | 175 | 76 |
| AlEt$_3$—TiCl$_3$ | 3 | 80 | 30 | 163 | 175 | 78 |
| AlEt$_3$—TiCl$_3$ | 2 | 80 | 20 | 123 |  | 66 |
| AlEt$_3$—TiCl$_3$ | 1 | 80 | 20 | 120 | 125 | 72 |
| AlEt$_3$—TiCl$_3$ | 4 | 80 | 20 | 80 | 170 |  |
| AlEt$_3$—TiCl$_3$ | 0.5 | 80 | 20 | 58 |  |  |
| AlEt$_2$Cl—TiCl$_3$ | 2 | 95 | 30 | About 50 |  |  |

[1] Temperature runaway to 112° C.
[2] Catalyst heated at 80° C. and cooled to room temperature before polymerization.

As seen from the above summary table successful polymerization has been obtained with 20% propylene over a range of Al/Ti ratios from 0.5/1 to 4/1. This is not possible with AlEt$_3$—TiCl$_4$ catalysts. At a 1/1 Al to Ti ratio under pressure this latter catalyst gives a low molecular weight oil, and at atmospheric pressure very little polymer is obtained at Al/Ti ratio less than 2. Successful polymerization of propylene with catalyst combinations TiCl$_3$ type catalyst may be further varied markedly by varying the type of aluminum alkyl compound used to activate the TiCl$_3$ constituent. Thus, one can obtain a product intermediate in properties between the AlEt$_3$—TiCl$_4$ and AlEt$_3$—TiCl$_3$ products by the substitution of diethyl monochloride for triethyl. With monoethyl the products have molecular weights below the minimum desired for usable solid propylene.

$TiCl_3$ polypropylene substitution of $AlEt_2Cl$ for $AlEt_3$

| Bomb Runs | T=84° C. | Press=400-650 p.s.i.g. | |
|---|---|---|---|
| Run | A | B | C |
| Catalyst System | $AlEt_3$—$TiCl_3$ | $\begin{Bmatrix} 2AlEt_3 \\ AlEt_2Cl \end{Bmatrix}TiCl_3$ | $AlEt_2Cl$—$TiCl_3$ |
| Al/Ti | 2 | 3.0 | 2 |
| Intrinsic Viscosity | 3.1 | 1.9 | 2.8 |
| Density, g/cc | 0.895 | | 0.877 |
| Tensile Strength, p.s.i. @ 25° C | 5,610 | 3,040 | 1,940 |
| Modulus of Rigidity × $10^{-5}$ p.s.i. @ 25° C | 1.67 | 0.42 | 0.25 |
| Cat. Efficiency | 125 | 64 | 125 |

Bomb runs result in a product that is in some respects different than that obtained from turbo runs in an autoclave, as shown by the following comparative data.

| | Bomb | Autoclave | | |
|---|---|---|---|---|
| Run | D | E | F | G |
| Catalyst System ($AlEt_3$—$TiCl_3$): | | | | |
| Al/Ti | 2 | 3 | 3 | 3 |
| Temperature, °C. (average) | 84 | 80 | 65 | 80 |
| Product Properties: | | | | |
| Intrinsic Vis | 3.1 | 2.9 | 3.0 | 2.9 |
| Specific Gravity | 0.895 | 0.896 | 0.894 | 0.892 |
| Tensile Strength (p.s.i.) | 5610 | 4130 | 3890 | 3160 |
| Percent Elongation | 100 | 0 | 100 | 35 |
| Modulus of Rigidity × $10^{-5}$ p.s.i. @ 25° C | 1.67 | 0.6 | 0.7 | 0.4 |

This is a reflection of different operating conditions and demonstrates versatility of polymer properties obtainable by this catalyst system. Some of the variables involved are:

(a) Catalyst concentration;
(b) Different temperature profiles;
(c) Markedly different run times;
(d) Pressure;
(e) Extent of agitation.

The turbo runs in the autoclave produced polypropylene having relatively higher tensile strength for any particular modulus of rigidity than corresponding bomb runs, and also higher than obtained with an $AlEt_3$—$TiCl_4$ catalyst.

An important and novel feature of the present invention is the production of solid polypropylene having a tensile strength of at least 2,000 p.s.i. Even many tensile strengths above 3,000 p.s.i. have been obtained. And, likewise important, these high tensile products have good processability, for extrusion, pressure moulding, and sheeting into thin self-supporting films.

The polymeric products of this invention, as for instance especially polypropylene, should preferably have a Harris molecular weight of at least 100,000; and the tensile strength is preferably 2,000 plus 1% of the modulus of rigidity at 25° C. (in p.s.i.).

It is not intended that the invention be limited to the above specific examples of materials and reaction conditions, but only by the appended claims in which it is intended to claim all novelty inherent in the invention, as well as all modifications coming within the scope and spirit of the invention.

What is claimed is:

1. The process for polymerizing alpha olefins having the general formula R—CH=$CH_2$, in which R is a hydrocarbon group, in the presence of a catalyst consisting essentially of (a) a partially reduced titanium halide, (b) 0.1 to 1.0 mols of unreacted titanium metal per 4 mols of titanium halide, and (c) an aluminum alkyl-compound in amount sufficient to give an Al/Ti molar ratio of 0.1 to 20.0.

2. The process of claim 1 wherein R is an alkyl group of 1 to 6 carbon atoms and the polymerizing reaction is carried out for 1 to 100 hours at a temperature of from 20 to 100° C. and a pressure of 50 to 1500 p.s.i.g.

3. Process according to claim 2, using a monomer concentration of about 20 to 30%.

4. Process according to claim 6 in which the aluminum alkyl compound is aluminum triethyl.

5. Process according to claim 6 in which the aluminum alkyl compound is aluminum diethyl monochloride.

6. The process of claim 1 wherein said reduced titanium halide is violet crystalline $TiCl_3$ and said aluminum alkyl compound contains from 2 to 3 alkyl groups.

7. The process of claim 6 wherein the alpha olefin is propylene.

8. The method of making high molecular weight crystalline polypropylene which comprises reducing 3 moles of $TiCl_4$ with 0.5 to 2.0 moles of powdered Ti at a temperature of about 400 to 500° C. under a pressure of about 5 to 100 atmospheres, to obtain a solid catalyst constituent consisting essentially of violet crystalline $TiCl_3$ having about 5 to 25% of metallic titanium intimately associated therewith, pulverizing the resultant product, suspending it in inert diluent and adding thereto a solution of aluminum triethyl in inert diluent in quantity sufficient to give an Al/Ti molar ratio of 0.5 to 5, and then adding propylene to make a concentration of 15 to 35%, and agitating and heating the mixture under a pressure of about 100–1000 p.s.i.g. and a temperature of about 60–90° C. for about 1 to 40 hours, and separating from the resulting polymerization reaction mixture a high molecular weight solid polypropylene containing a major proportion of crystalline polypropylene having an intrinsic viscosity of at least about 3.0, a softening point of about 155° C., a melting point of about 165° C., and being insoluble in boiling heptane.

9. Process according to claim 8, using molar Al/Ti ratio of 0.5/1 to 4/1 in the catalyst.

10. Process according to claim 9, using a molar Al/Ti ratio less than 2 in the catalyst.

References Cited in the file of this patent

UNITED STATES PATENTS

| 2,721,189 | Anderson et al. | Oct. 18, 1955 |
| 2,767,160 | Field et al. | Oct. 16, 1956 |

FOREIGN PATENTS

| 538,782 | Belgium | Dec. 6, 1955 |
| 1,132,506 | France | Nov. 5, 1956 |
| 1,139,806 | France | Feb. 18, 1957 |